(12) United States Patent
Yang et al.

(10) Patent No.: US 12,741,434 B2
(45) Date of Patent: Sep. 22, 2026

(54) FOLLOW-UP CONTROL METHOD AND SYSTEM FOR FORMING MACHINE

(71) Applicants: MESNAC CO., LTD., Qingdao (CN); QINGDAO MESNAC MACHINERY & ELECTRIC ENGINEERING CO., LTD., Qingdao (CN)

(72) Inventors: Huili Yang, Qingdao (CN); Yunfei Liu, Qingdao (CN); Gang Xie, Qingdao (CN); Dongyun Hou, Qingdao (CN); Yaxiong Chen, Qingdao (CN)

(73) Assignees: MESNAC CO., LTD., Qingdao (CN); QINGDAO MESNAC MACHINERY & ELECTRIC ENGINEERING CO., LTD., Qingdao (CN)

( * ) Notice: Subject to any disclaimer, the term of this patent is extended or adjusted under 35 U.S.C. 154(b) by 61 days.

(21) Appl. No.: 18/723,806

(22) PCT Filed: Dec. 22, 2022

(86) PCT No.: PCT/CN2022/141183
§ 371 (c)(1),
(2) Date: Jun. 24, 2024

(87) PCT Pub. No.: WO2023/116844
PCT Pub. Date: Jun. 29, 2023

(65) Prior Publication Data

US 2025/0058537 A1 Feb. 20, 2025

(30) Foreign Application Priority Data

Dec. 22, 2021 (CN) ........................ 202111585297.9

(51) Int. Cl.
*B29D 30/32* (2006.01)

(52) U.S. Cl.
CPC ...... *B29D 30/32* (2013.01); *B29D 2030/3214* (2013.01)

(58) Field of Classification Search
CPC .............. B29D 30/005; B29D 30/0016; B29D 30/0022; B29D 30/0038; B29D 30/0044;
(Continued)

(56) References Cited

U.S. PATENT DOCUMENTS 5,354,404 A * 10/1994 Benjamin .......... B29D 30/3007 156/405.1

FOREIGN PATENT DOCUMENTS

CN 103182787 7/2013
CN 111746013 10/2020

OTHER PUBLICATIONS

Zhang Xiao-chen, CN-111746013-A, machine translation. (Year: 2020).*

(Continued)

*Primary Examiner* — Sedef E Paquette
(74) *Attorney, Agent, or Firm* — Jiwen Chen; Joywin IP Law PLLC

(57) ABSTRACT

A follow-up control method and follow-up control system for a forming machine. The follow-up control method includes: responding to an instruction for a forming drum module to move from a fitting station to a locking ring station, controlling the forming drum module and the stitching and pressing roller module to move towards the ring locking station, in which the moving speed of the stitching and pressing roller module to the ring locking station has a pre-set speed difference from the moving speed of the forming drum module to the ring locking station, controlling a sewing pressure roller module to perform a sewing operation on a compound joint on a molding drum module, and when the molding drum module reaches a pre-set position
(Continued)

before a loop locking position of the loop locking station, the sewing pressure roller module completes the sewing operation.

8 Claims, 2 Drawing Sheets

(58) Field of Classification Search
CPC ........ B29D 30/08; B29D 30/10; B29D 30/12; B29D 30/18; B29D 30/24; B29D 30/244; B29D 30/26; B29D 30/32; B29D 2030/105; B29D 2030/3207; B29D 2030/3214
USPC .......................................................... 156/414
See application file for complete search history.

(56) References Cited

OTHER PUBLICATIONS

Cheng, Ji-guo, CN-103182787-A, machine translation provided by examiner for foreign document already of record. (Year: 2013).*

* cited by examiner

FOLLOW-UP CONTROL METHOD AND SYSTEM FOR FORMING MACHINE

CROSS-REFERENCE TO RELATED APPLICATION

This is a U.S. national stage application of PCT Application No. PCT/CN2022/141183 under 35 U.S.C. 371, filed Dec. 22, 2022 in Chinese, claiming priority to and the benefit of Chinese Patent Application No. 202111585297.9, filed with the China National Intellectual Property Administration (CNIPA) on Dec. 22, 2021, all of which are hereby incorporated by reference in their entirety.

TECHNICAL FIELD

The present application relates to the technical field of tire molding, and in particular, to a follow-up control method and follow-up control system for a molding machine.

BACKGROUND TECHNOLOGY

Generally, tire forming needs to be performed on a tire forming device; a plurality of moving members are usually arranged on a forming machine; and actions of different moving members in automatic control are greatly different due to differences in types, such as differences in pneumatic and servo moving members. At the same time, the control operations of different motion components in the control often have a sequential order, and thus there must be processes such as waiting, starting, running, and stopping in the motion process, so that the motion control of the system is mainly composed of an execution time period process, a waiting time period process, and a motion process, so that the execution cycle of the system is very long.

In conclusion, how to solve the problem that the operation execution cycle is long in the control method of the forming machine has become a technical problem to be solved urgently by those skilled in the art.

SUMMARY OF THE INVENTION

The object of the present application is to provide a follow-up control method and follow-up control system for a forming machine, so as to solve the problem that the control method for a forming machine has a long operation execution cycle.

In order to achieve the described object, the present application provides a follow-up control method for a forming machine. The follow-up control method comprises:

in response to an instruction for the forming drum module to move from the laminating station to the locking ring station, controlling the forming drum module and the stitching pressure roller module to move towards the locking ring station, the speed of movement of the stitching and pressing roller module towards the locking ring station is different from the speed of movement of the shaping drum module towards the locking ring station by a pre-set speed difference, so as to control the sewing and pressing roller module to perform a sewing operation on the composite joint on the shaping drum module, and when the building drum module reaches a preset position before the collar position of the collar station, The stitching roll module completes the stitching operation.

Preferably, the follow-up control method further comprises: in response to an instruction for moving the forming drum module from the laminating station to the locking ring station, controlling the left tire bead transferring ring module and the right tire bead transferring ring module to move so that when the forming drum module reaches the locking ring position, the left tire bead transferring ring module and the right tire bead transferring ring module respectively reach their respective upper ring positions.

Preferably, the left bead transferring ring module and the right bead transferring ring module move in such a way that when the building drum module reaches the preset position, the spacing between the left bead transferring ring module and the right bead transferring ring module reaches the spacing required for the upper ring, and the central position of the left bead transferring ring module and the right bead transferring ring module exactly coincides with the central position of the building drum of the building drum module; moving the three of the profiled drum module, the left bead transfer ring module and the right bead transfer ring module to the lock ring position at the same speed when the profiled drum module is moved from the preset position to the lock ring position.

Preferably, the follow-up control method further comprises: when the shaping drum module reaches the preset position, issuing a propping instruction to the shaping drum, wherein a propping component on the shaping drum performs a propping action in response to the propping instruction, so that the shaping drum at least partially completes the propping action when the shaping drum module reaches the bind ring position.

Preferably, the follow-up control method further comprises: acquiring an issuing time of the propped up instruction; delaying the issuing time of the propped up instruction by a pre-set duration, sending a release command to the bead bearing members on the left and right bead transfer ring modules, respectively, the bead bearing member releasing the beads in response to the release command such that the left and right bead transferring ring modules each reach their respective upper race positions, The bead bearing member completes at least part of the bead movement.

Preferably, the follow-up control method further comprises: when the building drum module reaches the bind-off position, detecting whether the bead bearing component has been released into position; if so, controlling the building drum module to move towards the building station; if not, controlling the building drum module, the left bead transferring ring module and the right bead transferring ring module to stay at their respective current positions.

Preferably, the follow-up control method further comprises:

in response to an instruction for moving the forming drum module from the locking ring station to the forming station, controlling the forming drum module to move to the forming station to a designated position, and the stitching pressure roller module, the left bead transferring ring module and the right bead transferring ring module all moving together relative to a machine case of the forming drum module; simultaneously controlling the belt layer transfer ring module and the combined pressure roller module located at the forming station to move towards the designated position;

when it is detected that the forming drum module, the belt layer transfer ring module and the combined pressure roller module are all moved to the designated position, controlling the forming drum module, the belt layer transfer ring module, the combined pressure roller module, the stitching pressure roller module, the left bead transfer ring module and the right bead transfer ring module to move towards the rolling finishing station at the same speed.

Preferably, the follow-up control method further comprises: when the belt transmission ring module moves from the specified position to the rolling finishing station, controlling a central compression roller of the belt transmission ring module to protrude and roll a crown of a green tire loaded on the shaping drum.

Preferably, the follow-up control method further comprises:

acquiring a starting time of the movement of the belt layer transfer ring module from the designated position to the rolling finishing station;

after delaying the starting time for a pre-set time interval, controlling the combined pressing roller module to perform a rolling operation on the crown according to a pre-set rolling curve.

Preferably, when the composite pressing roller module reaches a certain set position before the rolling finishing station, the composite pressing roller module completes at least a part of the rolling operation.

Preferably, the follow-up control method further comprises:

when said forming drum module reaches said rolling finishing station, detecting whether rolling of said crown is completed or not: if so, controlling each module to move to a next process station; If not, control the individual modules to stay at their respective current positions until the crown rolling is completed.

Compared with the introduction of the background art, the follow-up control method for the described forming machine comprises: in response to an instruction for a forming drum module to move from a fitting station to a locking ring station, controlling the forming drum module and the stitching and pressing roller module to move towards the ring locking station, in which the moving speed of the stitching and pressing roller module to the ring locking station has a pre-set speed difference from the moving speed of the forming drum module to the ring locking station, controlling a sewing pressure roller module to perform a sewing operation on a compound joint on a molding drum module, and when the molding drum module reaches a pre-set position before a loop locking position of the loop locking station, the sewing pressure roller module completes the sewing operation. The follow-up control method, in the actual application process, follows a forming drum module by means of a stitching pressure roller module to move towards a lock ring workstation. Since the forming drum module and the sewing pressure roller module have a pre-set speed difference when moving towards the locking station, the stitching compression roller module can move relative to the composite joint on the molding drum module, and then can perform a stitching operation on the composite joint on the molding drum module. Since the sewing operation of the sewing roller module is carried out simultaneously with the locking process of the shaping drum module, in contrast to the conventional progressive manner, the action execution cycle during the entire control of the molding machine is greatly shortened.

In addition, the present application also provides a follow-up control system for a forming machine, comprising a forming drum module, a belt transmission ring module, a combined pressure roller module, a stitching pressure roller module, a left bead transmission ring module, a right bead transmission ring module and a controller. The controller can control follow-up motion of each module according to the follow-up control method described in any one of the described solutions. Since the described follow-up control method has the described technical effect, the follow-up control system should also have the corresponding technical effect, which will not be repeated here.

BRIEF DESCRIPTION OF THE DRAWINGS

To describe the technical solutions in the embodiments of the present application or in the prior art more clearly, the following briefly introduces the accompanying drawings required for describing the embodiments or the prior art. Apparently, the accompanying drawings in the following description show merely some embodiments of the present application, other drawings may also be obtained according to these drawings without creative efforts.

The figures include the following reference signs:

1: a building drum module; 1*a*: a building drum; 1*b*: a chassis; 2: a stitching pressure roller module; 3: a left bead transferring ring module; 4: a right bead transferring ring module; 5: a belt transferring ring module; 6: a laminating pressure roller module; 21: a laminating station; 22: a locking station; 23: a building station; 24: a rolling finishing station.

DETAILED DESCRIPTION OF THE EMBODIMENTS

The core of the present application is to provide a follow-up control method and follow-up control system for a forming machine, so as to solve the problem that a control method for a forming machine has a long operation execution cycle.

To make persons skilled in the art better understand the technical solutions provided in the present application, the present application is further described in detail in the following with reference to the accompanying drawings and specific embodiments. Apparently, the embodiments to be described are only a part rather than all of the embodiments of the present application. All other embodiments obtained by a person of ordinary skill in the art based on the embodiments of the present application without creative efforts shall belong to the scope of protection of the present application.

Figure 1:
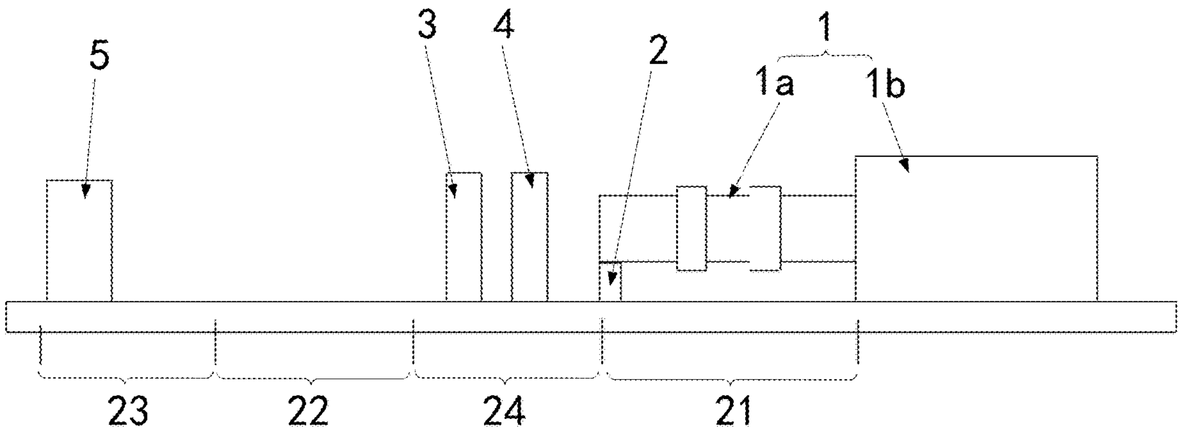
FIG. 1 is a schematic structural diagram of a molding machine module in a laminating station according to an embodiment of the present application.
Figure 2:
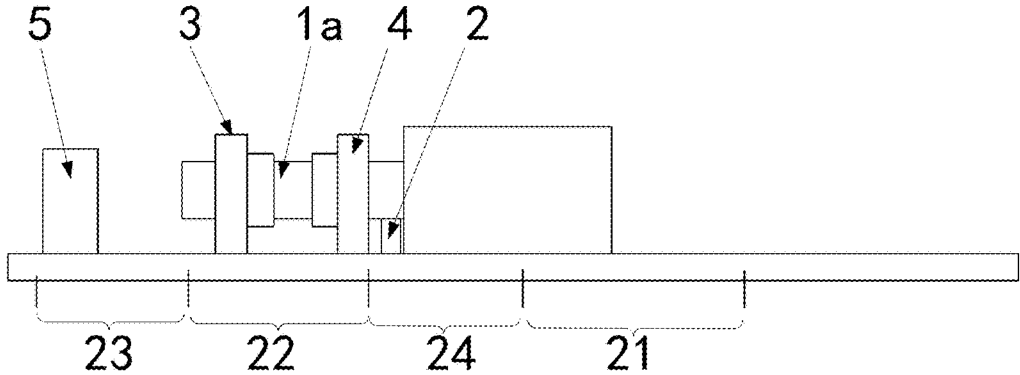
FIG. 2 is a schematic structural diagram of a molding machine module at a binder station according to an embodiment of the present application.

As shown in FIGS. 1 and 2, the embodiments of the present application provide a follow-up control method for a forming machine. The follow-up control method comprises:

in response to an instruction for the forming drum module 1 to move from the fitting station 21 to the ring locking station 22, controlling the forming drum module 1 and the stitching pressure roller module 2 to move towards the ring locking station 22, the speed of movement of the stitching compression roller module 2 to the ring locking station 22 and the speed of movement of the forming drum module 1 to the ring locking station 22 have a pre-set speed difference, in order to control the sewing and pressing roller module 2 to perform a sewing operation on the composite joint on the forming drum module 1, furthermore, when the forming drum module 1 reaches a pre-set position before the ring locking position of the ring locking station 22, the sewing pressure roller module 2 completes the sewing operation.

The follow-up control method, in the actual application process, follows a forming drum module by means of a stitching pressure roller module to move towards a lock ring workstation. Since the forming drum module and the sewing pressure roller module have a pre-set speed difference when moving towards the locking station, the stitching compression roller module can move relative to the composite joint on the molding drum module, and then can perform a stitching operation on the composite joint on the molding drum module. Since the sewing operation of the sewing roller module is carried out simultaneously with the locking process of the shaping drum module, in contrast to the conventional progressive manner, the action execution cycle during the entire control of the molding machine is greatly shortened.

It should be noted that, those skilled in the art should understand that the forming drum module 1 generally includes a chassis 1*b* and a forming drum 1*a*. In addition, the molding machine is divided into different stations along the horizontal movement direction of the molding drum module 1 corresponding to different operation processes. Generally, it comprises at least a laminating station 21, a locking station 22, a forming station 23 and a rolling finishing station 24, the shaping drum of the shaping drum module can complete a fitting action at a fitting station, and complete a locking action at a locking station, completing a forming operation at a forming station, and completing a rolling operation at a rolling end station. This part belongs to the prior art and will not be described in detail here.

In addition, it should be noted that the multiple modules on the forming machine include not only pneumatic control but also servo control, for example, the forming drum (including flat-width servo controlling drum width, rotating servo controlling drum rotation, rewinding servo controlling rewinding bar, and pneumatic valve controlling drum inflation) includes servo rotation control, servo movement control and pneumatic control; the combined pressure roller module (one for rolling the crown and the sidewall in a left-right symmetrical manner) comprises servo movement control and pneumatic control; In addition, the stitch pressure roller module 2, the left bead transferring ring module 3, the right bead transferring ring module 4, the belt transferring ring module 5, etc. also include servo movement control and pneumatic control. However, this is general knowledge of a person skilled in the art: there are relatively large differences between pneumatic control and servo control. For example, pneumatically, only the starting position and the ending position are checked, no process position is checked, and the control process thereof is unknown. However, a servo control process is fed back by an encoder in real time, and in the servo control process, the speed, displacement, etc. thereof are all settable running time thereof, and are also expected to be controllable. Conversely, the relevant parameter is uncontrollable, unknown during pneumatic control. However, in the system control, the two usually cooperate with each other to complete the whole process, which requires time and order. Therefore, in the prior control, in order to complete various action processes, various servo actions and pneumatic actions are generally completed at a certain position in sequence, and then moved to the next position to complete other process processes.

However, the technical solution of the present application breaks the past control logic, and through the conceptual design of a "node" (namely, a movement station of a forming machine), the air control and servo control can be completely coordinated without coordination. In addition, the design of the follow-up control concept makes the control process not be that the system runs to a certain position, and then the cooperation actions of various servos and the cooperation actions of various cylinders are completed, Instead, the coordination actions of the respective servos are completed during the movement, and the pneumatic coordination actions are completed at the same time, so that the respective drive components in the system finally complete various process steps during the continuous movement to realize real flexible control.

For example, in some specific embodiments, the follow-up control method further comprises: in response to an instruction of the forming drum module 1 moving from the laminating station 21 to the ring locking station 22, controlling the left bead transferring ring module 3 and the right bead transferring ring module 4 to move, so that when the forming drum module 1 reaches the ring locking position, the left bead transferring ring module 3 and the right bead transferring ring module 4 respectively reach their respective upper ring positions. By designing the movement of the left and right bead transfer ring modules 3, 4 to follow the movement of the building drum module 1 to the locked loop position, so that when the molding drum module reaches the lock ring position, both the left bead transferring ring module 3 and the right bead transferring ring module 4 are ready to be turned on. Compared with conventional step-by-step operation control, the accumulated execution time of the action can be greatly saved, which in turn helps to shorten the action execution cycle during the entire control process of the forming machine.

It should be noted here that the way of moving the left bead transferring ring module 3 and the right bead transferring ring module 4 may specifically be as follows: when the building drum module 1 reaches a preset position, the distance between the left bead transferring ring module 3 and the right bead transferring ring module 4 reaches the spacing required for the upper ring, and the central positions of the left bead transferring ring module 3 and the right bead transferring ring module 4 just coincide with the central position of the building drum 1*a* of the building drum module 1; when the building drum module 1 moves from the pre-set position to the locked loop position, the three, the building drum module 1, the left bead transfer ring module 3 and the right bead transfer ring module 4, move towards the locked loop position at the same speed. By moving the left bead transfer ring module 3 and the right bead transfer ring module 4 in such a way that when the shaping drum module reaches a preset position, the three components are controlled to move at a high speed, which is more convenient for operation execution and control to be unified, and at this time, the stitching pressure roller module has completed a stitching operation, the left bead transfer ring module 3 and the right bead transfer ring module 4 do not interfere with the stitching pressure roller module 2; at the same time, when the subsequent forming drum module moves from the pre-set position to the locked loop position, at least part of the actions of the upper loop and the locked loop can be executed during the movement.

For example, the follow-up control method can further comprise: when the molding drum module 1 reaches a preset position, giving a propping instruction to the molding drum 1*a*; the propping component on the molding drum 1*a* performs a propping action on the composite member on the molding drum 1*a* in response to the propping instruction, so that when the molding drum module 1 reaches a lock ring position, the molding drum 1*a* at least partially completes the propping action. By means of the method, a forming drum of a forming drum module can execute a stretching action, which can be executed during the movement of the forming drum to a ring locking position, thereby facilitating the superposition of execution time of different actions on the forming drum module, and further shortening an action execution cycle in the whole control process of a forming machine.

In a still further embodiment, the follow-up control method can further comprise: acquiring an issue time of the propped up instruction; sending a release command to the bead bearing components on the left and right bead transferring ring modules 3. The bead bearing members release the beads in response to a release command such that the left and right bead transfer ring modules 3, 4 respectively reach their respective upper loop positions. The bead-bearing component completes at least part of the rolling motion. In this way, the circling movement of the left and right bead transferring ring modules 3, 4 can be followed by the stretching movement of the building drum, thereby further shortening the movement execution cycle of the building machine in the entire control process. The reason why the bead bearing component is released after a pre-set time period is delayed after a strutting instruction is sent is that after the strutting instruction is sent, the strutting operation of the forming drum needs to be performed for a certain time period so that the composite component can be strutted, the pre-set time period of delay is usually about 0.5 seconds, and the specific time period can be determined according to the actual configuration of the forming machine.

It should be noted that the bead bearing member may specifically be a bead suction cup, or another bead bearing member commonly used by those skilled in the art, such as a clamping claw, as long as the function of bearing the bead can be achieved, which is not specifically limited herein.

In some more specific embodiments, the follow-up control method can further comprise: when the building drum module 1 reaches a lock ring position, detecting whether the bead bearing component has been released to a position; if so, controlling the building drum module 1 to move towards the building station 23; if not, controlling the building drum module 1, the left bead transferring ring module 3 and the right bead transferring ring module 4 all to stay at their respective current positions. The purpose of designing the control logic is mainly to prevent some actions from failing to be completed due to various reasons, and by holding these modules in their respective current positions on the locking station, the modules can be waited to complete their respective actions to be completed, thereby not affecting the logic step sequence and timing sequence of the system and avoiding confusion.

Figure 3:
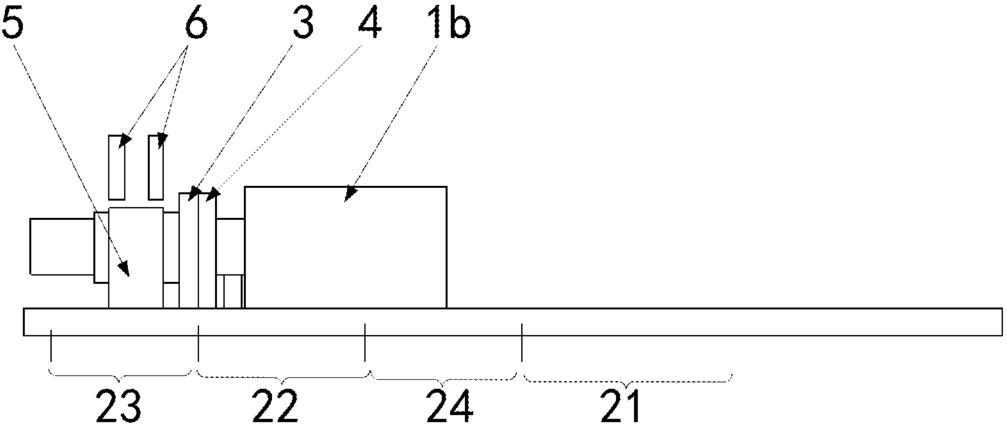
FIG. 3 is a schematic structural diagram of a molding machine module at a molding station according to an embodiment of the present application.

In some specific embodiments, as shown in FIGS. 2 and 3, the follow-up control method can further comprise: in response to an instruction of the forming drum module 1 moving from the locking collar station 22 to the forming station 23, controlling the forming drum module 1 to move towards a forming station 23 to a designated position, and the stitching pressure roller module 2, the left bead transfer ring module 3 and the right bead transfer ring module 4 all moving close relative to a machine box 1*b* of the forming drum module 1; simultaneously controlling the movement of the belt layer transfer ring module 5 and the composite pressing roller module 6 located at the forming station 23 towards a designated position; when it is detected that the building drum module 1, the belt transfer ring module 5 and the laminating-roller module 6 all move to a designated position, the building drum module 1, the belt transfer ring module 5, the laminating-roller module 6, the stitching-laminating-roller module 2, the left bead transfer ring module 3 and the right bead transfer ring module 4 are controlled to move towards the rolling finishing station 24 at the same speed. By designing the control logic, after arriving at a designated position, each module moves towards a rolling end station at the same speed, and then the operation of each module is executed and controlled more conveniently and more uniformly; at the same time, it also prepares for the follow-up movement of the belt layer transfer ring module 5 and the laminating-roller assembly 6 during the subsequent movement of the forming drum module from the forming station to the rolling finishing station.

Figure 4:
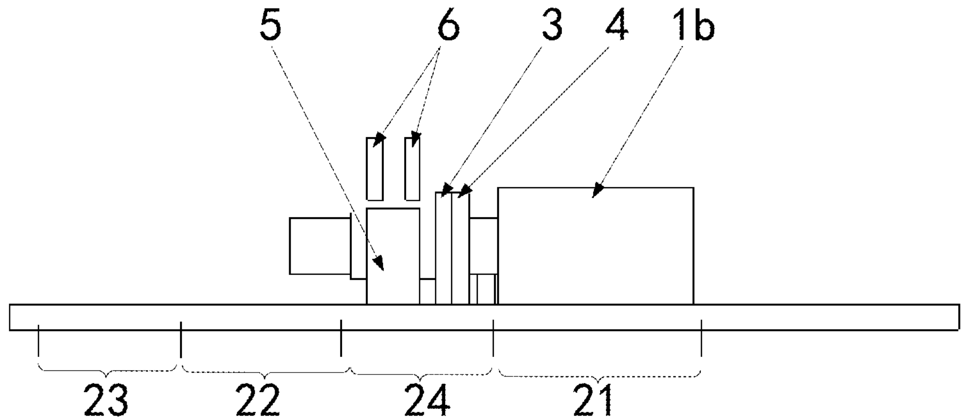
FIG. 4 is a schematic structural diagram of a molding machine module at a rolling finishing station according to an embodiment of the present application.

As shown in FIGS. 3 and 4, the follow-up control method can further comprise: when the belt layer transfer ring module 5 moves from a designated position to the rolling finishing station 24, controlling a central pressure roller of the belt layer transfer ring module 5 to protrude and roll the green tire loaded on the forming drum 1*a* (specifically, a crown of the green tire can be rolled, and a part of the side wall of the green tire can also be rolled). This operation of the belt ply transfer ring modules 5 to roll the crown can be carried out during this movement, thus helping to shorten the cycle of action during the entire control of the molding machine.

In some more specific embodiments, the follow-up control method further comprises: acquiring a start time of the movement of the belt layer transfer belt loop module 5 from a designated position to the rolling finishing station 24; after delaying a pre-set time interval on the basis of the starting time, controlling the combined pressure roller module 6 to perform a rolling operation on the crown according to a pre-set rolling curve. Since the belt transfer belt loop module is performing crown rolling at the starting time, the pre-set time interval is delayed based on the starting time (for example, after the preset time interval is 1.5 seconds, the combined roll module rolls the crown according to a preset roll curve, the following cooperative movement of the combined roller pressing module 6 and the belt layer transfer ring module 5 can be achieved, and the movement sequence is more reasonable and complies with the action execution sequence logic of the forming machine.

It should be noted that, when the composite pressing roller module 6 reaches a certain set position before the rolling finishing station 24, the composite pressing roller module 6 at least completes a partial rolling operation.

For example, when the composite pressing roller module 6 reaches a certain set position before the rolling finishing station 24, the rolling operation of the composite pressing roller module has been completed, and thus the composite pressing roller module can be controlled to withdraw from the rolling position.

For another example, when the composite pressing roller module 6 reaches a certain set position before the rolling finishing station 24, the rolling operation of the composite pressing roller module is only partially completed, and the rolling operation needs to be continuously performed in the process of moving from the set position to the rolling finishing module until the rolling operation is completely completed.

When the composite pressing roller module 6 reaches a certain set position before the rolling finishing station 24 and the rolling operation of the composite pressing roller module is only partially completed, the follow-up control method can further comprise: when the forming drum module 1 reaches the rolling finishing station 24, detecting whether the rolling of the crown is completed or not; if so, controlling the movement of each module towards the next process station; if not, control the individual modules to stay at their respective current positions until the crown rolling is completed. The purpose of designing the control logic is mainly to prevent some actions from failing to be completed due to various reasons, and by holding these modules at their respective current positions on the rolling end station, the modules can be waited to complete their respective actions to be completed, thereby not affecting the logic step sequence and time sequence of the system and avoiding confusion.

In addition, the present application also provides a follow-up control system for a forming machine, comprising a forming drum module 1, a belt transmission ring module 5, a combined pressure roller module 6, a stitching pressure roller module 2, a left bead transmission ring module 3, a right bead transmission ring module 4 and a controller. The controller can control follow-up movement of each module according to the follow-up control method described in any one of the described solutions. Since the described follow-up control method has the described technical effect, the follow-up control system should also have the corresponding technical effect, which will not be repeated here.

In order to better understand the technical solutions of the present application by those skilled in the art, a brief description will be given below with reference to a working process of a more specific preferred implementation solution:

Example 1: Follow-Up Control of Stitch and Loop Process

As shown in FIGS. 1-2, the building drum module 1 and the stitch roller module 2 will simultaneously move to the left with a certain speed difference, before the central position of the shaping drum 1*a* and the central positions of the distances between the left bead transfer ring module 3 and the right bead transfer ring module 4 are to be overlapped, the composite joint attached to the drum is basically sewed by the sewing roller module 2 by means of the displacement difference between the shaping drum module 1 and the sewing roller module 2. At this point, the left bead transfer ring module 3, the right bead transfer ring module 4 will begin accelerating when the center position of the building drum 1*a* coincides with the center position of the distance between the left bead transfer ring module and the right bead transfer ring module, the three will move leftward at the same speed, at which point the stitching pressure roller module 2 has completed the stitching of the compound joint;

at the same time, the system sends a stretching instruction to the two shaping drums on the shaping drum module;

0.5 seconds later, a pneumatic control open command is sent to the left bead transfer ring module and the right bead transfer ring module, and the bead bearing component will be open; at this time, the four modules are not moved to the position of the locking ring; after the left bead transfer ring module and the right bead transfer ring module are pneumatically controlled to open the ring body, the cylinder-in-place detection switch feeds back that it is open;

then the left bead transfer ring module, the right bead transfer ring module and the building drum module move together to the left in a descending manner. The above actions are performed (if not done for various reasons) before the building drum module reaches the lock ring position of the lock ring station, the device will be at the locking station until the execution of the action is completed, thereby not affecting the logic step sequence and time sequence of the system, without clutter phenomena, the system directly sends instructions to the forming station, and the stitching compression roller module 2, the left bead transferring ring module 3 and the right bead transferring ring module 4 will move to the left with the chassis 1*b* of the forming drum module 1 kept at a short distance and at the same speed, the stitching and upper loop follow-up process is thus completed.

Example 2: Follow-Up Control of the Crown Process as shown in FIGS. 3 to 4, a shaping drum module 1, a left bead transferring ring module 3, a right bead transferring ring module 4, a sewing pressure roller module 2, a belt transferring ring module 5, and a combined pressure roller module 6 will simultaneously move to the right at a certain equal speed, and at this moment, a central pressure roller on the belt transferring ring module 5 will extend out of a rolling crown;

after 1.5 seconds, the combined pressing roller module 6 will be in contact with the crown, and at the same time, the pressing roller part of the combined pressing roller module completes rolling by superimposing a simulated tire surface curve on a crown rolling curve while maintaining a right displacement speed;

In this case, each module will be close to the rolling finishing station, and the system will send a withdrawal instruction of the combined roller pressing module 6, and at this moment, the two roller pressing parts of the combined roller pressing module 6 will withdraw while moving to the right at the same speed.

When the above motion execution completion system sends a command to the next position directly before the rolling finishing station is reached, the modules follow up to complete the next process. However, if the operation is not completed due to various reasons, the device stops at the rolling end station until the operation is completed, thereby not affecting the logic step sequence and the time sequence of the system, and the phenomenon of chaos will not occur.

In summary, the present application has the following technical effects:

1. realizing follow-up control of a host machine forming process, and improving the production efficiency of a device.
2) Seamless ramp for follow-up control and positioning control, thereby achieving a multi-functional, flexible and stable control target.
3) realizing cooperative operation of multiple servos, multiple structures and multiple modules.
4. achieving the integration of a servo accurate positioning mechanism and coarse position control such as air movement.
5. The air travel and the process must work together, and at the same time, the acceleration and deceleration process of starting and stopping the moving part of the device is omitted, thereby greatly shortening the cycle period and improving the production efficiency.

The follow-up control method and follow-up control system for the forming machine provided by the present application are described in detail above. It should be noted that, each embodiment in this description is described in a progressive manner, each embodiment focuses on a difference from other embodiments, and reference may be made to the same or similar parts among the embodiments.

It should also be noted that, in this specification, terms such as 'include', 'comprise', or any other variation thereof are intended to cover a non-exclusive inclusion, so that an item or a device that includes a series of elements not only includes those elements, but also includes other elements that are not explicitly listed, or further includes elements that are inherent to the item or the device. If no more limitations are imposed, an element limited by 'include a . . . ' does not exclude that another same element exists in an article or a device that includes the foregoing element.

The principle and embodiments of the present disclosure are described herein through specific examples, and the description of the above embodiments is only used to help understand the core idea of the present disclosure. It should be noted that, a person of ordinary skill in the art may further make improvements and modifications to the present application without departing from the principle of the present application, and these improvements and modifications also belong to the scope of protection of the claims of the present application.

What is claimed is:

1. A follow-up control method for a forming machine, comprising: in response to an instruction for a molding drum module to move from a fitting station to a ring locking station, controlling the molding drum module and a stitching pressure roller module to move towards the ring locking station, a speed of movement of the stitching pressure roller module towards the ring locking station and a speed of movement of the molding drum module towards the ring locking station have a pre-set speed difference, so as to control the stitching pressure roller module to stitch a composite joint on the molding drum module;

wherein, when the molding drum module reaches a preset position before a loop lock position of a loop lock station, the stitching pressure roller module completes a stitching operation; and wherein, the follow-up control method further comprises: in response to the instruction for the molding drum module to move from the fitting station to the ring locking station, controlling a left tire bead transferring ring module and a right tire bead transferring ring module to move so that the molding drum module arrives at the locking station, the left tire bead transferring ring module and the right tire bead transferring ring module reach respective upper ring positions.

2. The follow-up control method for the forming machine according to claim 1, wherein the left tire bead transferring ring module and the right tire bead transferring ring module move in such a way that when the molding drum module reaches the preset position, a spacing between the left tire bead transferring ring module and the right tire bead transferring ring module is up to a spacing required for the upper ring position, central positions of the left tire bead transferring ring module and the right tire bead transferring ring module directly coincide with a central position of a forming drum of the molding drum module; when said molding drum module moves from said preset position to a buckle position, said molding drum module, said left tire bead transferring ring module, and said right tire bead transferring ring module move at a same speed to said buckle position.

3. The follow-up control method for the forming machine as claimed in claim 2, characterized in that the follow-up control method further comprises: when the molding drum module reaches the preset position, giving a propping command to the forming drum, a propping means on the forming drum performing a propping action in response to the propping command, so that when the molding drum module reaches a lock ring position, the forming drum at least partially completes a stretching action.

4. The follow-up control method for the forming machine according to claim 3, wherein the follow-up control method further comprises: acquiring an issuing time of the propping command; sending a release command to bead bearing components on the left tire bead transferring ring module and the right tire bead transferring ring module after a delay of a preset duration based on a sending time of the propping command, a bead carrier means releasing beads in response to the release command such that the left tire bead transferring ring module and the right tire bead transferring ring module each reach respective upper loop positions, the bead bearing component completes at least part of a bead movement.

5. The follow-up control method for the forming machine according to claim 4, characterized in that the follow-up control method further comprises: when the molding drum module reaches the lock ring position, detecting whether the bead bearing component has been released into place; if so, controlling the molding drum module to move towards a building station; if not, controlling the molding drum module, the left tire bead transferring ring module and the right tire bead transferring ring module to stay at their respective current positions.

6. The follow-up control method for the forming machine according to claim 5, further comprising:

in response to an instruction for the molding drum module to move from the ring locking station to the building station, controlling the molding drum module to move to the building station to a designated position, and the stitching pressure roller module, the left tire bead transferring ring module and the right tire bead transferring ring module all performing a gathering movement relative to a machine box of the molding drum module; simultaneously controlling a belt layer transfer ring module and a composite pressing roller module located at the building station to move towards the designated position;

when it is detected that the molding drum module, the belt layer transfer ring module and the composite pressing roller module are all moved to the designated position, controlling the molding drum module, the belt layer transfer ring module, the composite pressing roller module, the stitching pressure roller module, the left tire bead transferring ring module and the right tire bead transferring ring module to move towards a rolling finishing station at the same speed.

7. The follow-up control method for the forming machine as claimed in claim 6, characterized in that the follow-up control method further comprises: when the belt layer transfer ring module moves from the designated position to the rolling finishing station, controlling a central pressure roller of the belt layer transfer ring module to protrude and roll a green tire loaded on the forming drum.

8. A follow-up control system for a forming machine, comprising a molding drum module, a belt layer transfer ring module, a composite pressing roller module, a stitching pressure roller module, a left tire bead transferring ring module, a right tire bead transferring ring module, and a controller, characterized in that the controller can control follow-up movement of each module according to the follow-up control method as claimed in claim 1.

* * * * *